United States Patent
Choi et al.

(10) Patent No.: US 9,481,259 B2
(45) Date of Patent: Nov. 1, 2016

(54) BIDIRECTIONAL VEHICLE CHARGING APPARATUS AND OPERATION METHOD THEREOF

(71) Applicant: LSIS CO., LTD., Anyang-si, Gyeonggi-do (KR)

(72) Inventors: Heon Soo Choi, Gwangmyeong-si (KR); Gi Hyun Kwon, Gunpo-si (KR)

(73) Assignee: LSIS CO., LTD, Anyang-si (KR)

( * ) Notice: Subject to any disclaimer, the term of this patent is extended or adjusted under 35 U.S.C. 154(b) by 557 days.

(21) Appl. No.: 13/945,778

(22) Filed: Jul. 18, 2013

(65) Prior Publication Data

US 2014/0021780 A1    Jan. 23, 2014

(30) Foreign Application Priority Data

Jul. 18, 2012  (KR) .................. 10-2012-0078172

(51) Int. Cl.
B60L 11/18  (2006.01)

(52) U.S. Cl.
CPC ........ B60L 11/1824 (2013.01); B60L 11/1812 (2013.01); Y02T 10/7005 (2013.01); Y02T 10/7072 (2013.01); Y02T 90/12 (2013.01); Y02T 90/121 (2013.01); Y02T 90/127 (2013.01); Y02T 90/14 (2013.01)

(58) Field of Classification Search
None
See application file for complete search history.

(56) References Cited

U.S. PATENT DOCUMENTS

| 8,138,624 | B2* | 3/2012 | Yeh | B60L 1/00 307/10.1 |
| 9,227,516 | B2* | 1/2016 | Hatanaka | B60L 9/22 |
| 2011/0176343 | A1* | 7/2011 | Kojima | B60L 11/1811 363/132 |
| 2012/0074901 | A1* | 3/2012 | Mohammed | B60L 11/1842 320/109 |
| 2012/0249065 | A1* | 10/2012 | Bissonette | B60L 11/184 320/109 |

FOREIGN PATENT DOCUMENTS

| CN | 101401287 | 4/2009 |
| CN | 202142879 | 2/2012 |
| JP | 3034860 | 4/2000 |

(Continued)

OTHER PUBLICATIONS

The State Intellectual Property Office of the People's Republic of China Application Serial No. 201310381368.2, Office Action dated Jan. 14, 2015, 7 pages.

(Continued)

*Primary Examiner* — Rexford Barnie
*Assistant Examiner* — David Shiao
(74) *Attorney, Agent, or Firm* — Lee, Hong, Degerman, Kang & Waimey (57) ABSTRACT

Disclosed is a charging apparatus to supply a power to a battery of an electric vehicle. The charging apparatus includes a bidirectional power conversion unit including three pairs of switching device groups and having one end connected to a power system and an opposite end; an energy storage unit connected to the opposite end of the bidirectional power conversion unit to store the DC power output through the opposite end of the bidirectional power conversion unit; a multi-DC power output unit to output the DC power to an outside in the first inverse operation mode; and a charging control unit to detect a charging condition of the charging apparatus. The switching device groups serve as buck-converters, respectively, in the first inverse operation mode to convert the DC power into another DC power having a level different from a level of the DC power.

5 Claims, 7 Drawing Sheets

(56) References Cited

FOREIGN PATENT DOCUMENTS

| | | | |
|---|---|---|---|
| JP | 3211323 B2 * | 9/2001 | .......... B60L 11/1812 |
| JP | 2003-088130 | 3/2003 | |
| JP | 2010-166794 | 7/2010 | |
| JP | 2012-120295 | 6/2012 | |
| WO | WO 2012014540 A1 * | 2/2012 | ................ B60L 9/22 |

OTHER PUBLICATIONS

Korean Intellectual Property Office Application Serial No. 10-2012-0078172, Notice of Allowance dated May 27, 2014, 2 pages.

Japan Patent Office Application Serial No. 2013-149819, Office Action dated Apr. 16, 2014, 4 pages.

* cited by examiner

BIDIRECTIONAL VEHICLE CHARGING APPARATUS AND OPERATION METHOD THEREOF

CROSS-REFERENCE TO RELATED APPLICATIONS

Pursuant to 35 U.S.C. §119(a), this application claims the benefit of earlier filing date and right of priority to Korean Patent Application No. 10-2012-0078172, filed on Jul. 18, 2012, the contents of which is incorporated by reference herein in its entirety.

BACKGROUND

The embodiment relates to a charging apparatus. More particularly, the embodiment relates to a charging apparatus capable of performing a single DC charging, a multi-DC charging and a multi-AC charging according to charging environment.

An electric vehicle, which is one of advanced vehicles, is driven by using electric energy charged in a secondary battery after charging the secondary battery by connecting a power plug to the electric vehicle at home. In addition, a plug-in hybrid electric vehicle is mainly driven by using electric energy charged in a secondary battery after charging the secondary battery by connecting a power plug to the electric vehicle and general fossil fuel can be used in emergency when the electric energy is insufficient. The plug-in hybrid electric vehicle is also called a gird-connected hybrid electric vehicle.

Figure 1:
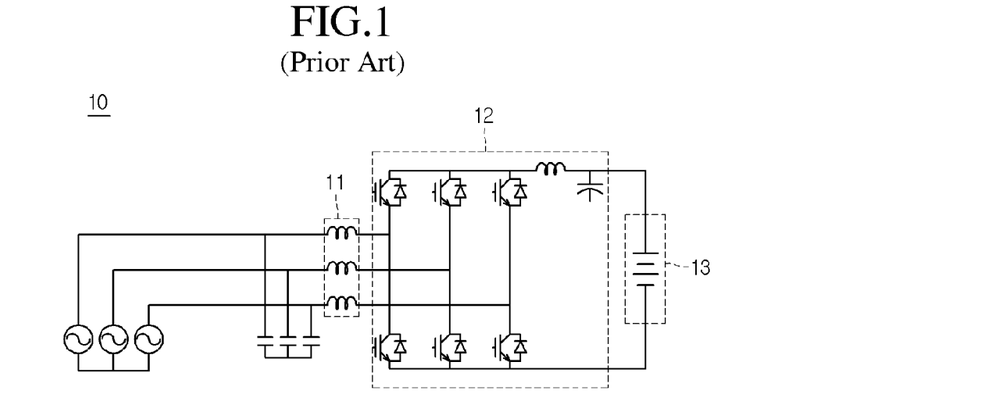
FIG. 1 is a view to explain a charging apparatus according to the related art.

FIG. 1 is a view to explain a charging apparatus according to the related art.

Referring to FIG. 1, the charging apparatus 10 includes an input filter 11, an AC-DC converter 11 and a high voltage battery 13.

The input filter receives 3-phase AC power from the outside and removes noise contained in each phase of the 3-phase AC power.

The input filter 11 may include three inductors connected to each phase of the 3-phase AC power.

The AC-DC converter 12 converts AC power input through the input filter into DC power to output the DC power.

In addition, in the inverse operation mode, the AC-DC converter 12 converts the DC power stored in the high voltage battery 13 into the AC power to output the AC power.

The high voltage battery 13 is charged by the DC power output through the AC-DC converter 12.

As described above, the charging apparatus 10 according to the related art may utilize an AC-DC module as a DC-AC module by inversing the operation mode, but the function of a DC output terminal and an AC output terminal is fixed and the DC power or the AC power may be output by symmetrically changing the power conversion direction.

SUMMARY

The embodiment provides a charging apparatus capable of realizing the cost reduction and the volume reduction by commonly utilizing common sections of functional modules, such as an AC-DC conversion module and a DC-AC conversion module, when forming a power converter of a mass-storage charger.

Technical objects of the embodiment may not be limited to the above object and other technical objects of the embodiment will be apparent to those skilled in the art from the following description.

According to the embodiment, there is provided a charging apparatus to supply a power to a battery of an electric vehicle. The charging apparatus includes a bidirectional power conversion unit including three pairs of switching device groups and having one end connected to a power system and an opposite end connected to an energy storage unit, in which the bidirectional power conversion unit converts an AC power input through the one end into a DC power to output the DC power to the opposite end in a forward operation mode and converts the DC power input through the opposite end into a plurality of DC powers to output the DC powers to the one end in a first inverse operation mode; the energy storage unit connected to the opposite end of the bidirectional power conversion unit to store the DC power output through the opposite end of the bidirectional power conversion unit; a multi-DC power output unit disposed between the power system and the one end of the bidirectional power conversion unit to output the DC power, which is output through the one end of the bidirectional power conversion unit, to an outside in the first inverse operation mode; and a charging control unit to detect a charging condition of the charging apparatus, in which the charging control unit operates the bidirectional power conversion unit in the forward operation mode to charge the energy storage unit when the charging condition is a first condition and operates the bidirectional power conversion unit in the first inverse operation mode to output the DC power through the multi-DC power output unit when the charging condition is a second condition, wherein the three pairs of the switching device groups of the bidirectional power conversion unit serve as buck-converters, respectively, in the first inverse operation mode to convert the DC power into another DC power having a level different from a level of the DC power.

According to the embodiment, there is provided a method of operating a charging apparatus including a bidirectional power conversion unit. The method includes checking a preset charging condition; converting an AC power supplied from a power system into a single DC power to charge an internal battery with the single DC power when the preset charging condition satisfies a first condition; supplying the single DC power to an electric vehicle when the preset charging condition satisfies a second condition; and converting the single DC power charged in the internal battery into a plurality of DC powers to supply the DC powers to at least one electric vehicle when the preset charging condition satisfies a third condition.

DETAILED DESCRIPTION OF THE EMBODIMENTS

The principle of the embodiments will be described below. Therefore, although not specifically described and depicted in the specification, a person having the ordinary skill in the art may realize the principle of the embodiments and may invent various apparatuses within the concept and scope of the embodiments. Further, in principle, conditional terms and embodiments mentioned in the specification shall be obviously intended to understand the concept of the embodiments and may not limit the scope of the embodiments.

Further, it shall be understood that all detailed descriptions, which teach a specific embodiment as well as a principle, an aspect and embodiments, are intended to include structural and functional equivalents. Further, it should be understood that the equivalents may include equivalents to be developed in the future as well as known equivalents and may include all devices invented for performing the same functions regardless of the structure thereof.

Hereinafter, a charging apparatus will be described, in which the charging apparatus can allow a power converter to have a flexible structure, can construct various charging ports in an AC charging station and a DC charging station, and can realize the cost reduction and the volume reduction by commonly utilizing common sections of functional modules, such as an AC-DC conversion module and a DC-AC conversion module, when forming a power converter of a mass-storage charger.

Figure 2:
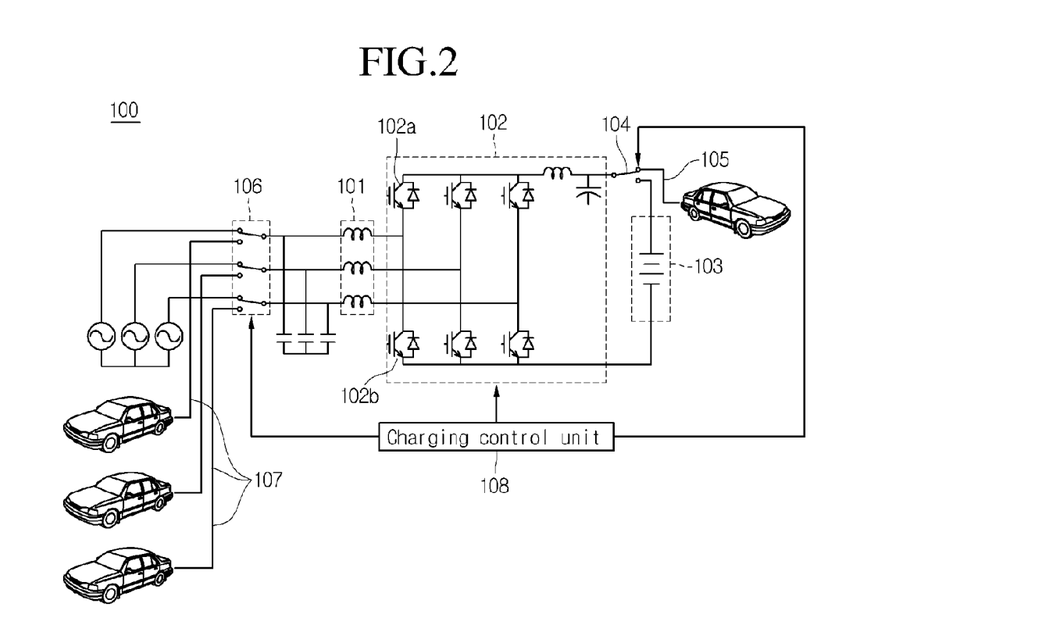
FIG. 2 is a view to explain a charging apparatus according to a first embodiment.
Figure 3:
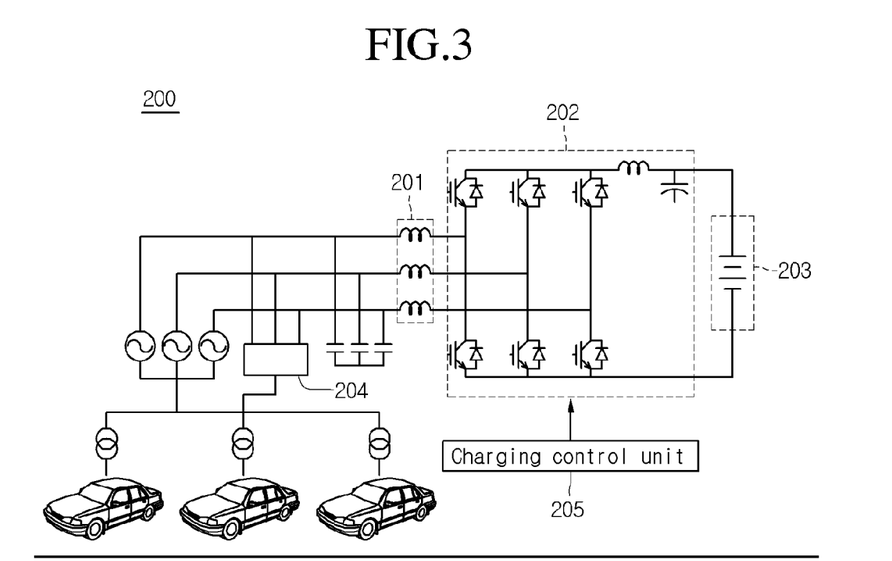
FIG. 3 is a view to explain a charging apparatus according to a second embodiment.

FIG. 2 is a view to explain a charging apparatus according to a first embodiment and FIG. 3 is a view to explain a charging apparatus according to a second embodiment.

Although the charging apparatus according to the first embodiment and the charging apparatus according to the second embodiment are separately illustrated, the charging apparatuses can be integrated as a single charging apparatus.

For instance, a single charging apparatus having the functions of the charging apparatuses according to the first and second embodiments can be provided by adding an AC power output function of the charging apparatus according to the second embodiment to the charging apparatus according to the first embodiment.

In the following description, the charging apparatus having the DC power output function and the charging apparatus having the AC power output function will be described separately.

Referring to FIG. 2, the charging apparatus 100 according to the first embodiment includes an input filter 101, a bidirectional power conversion unit 102, an internal battery 103, a first switch 104, a first DC power output unit 105, a second switch 106 and a second DC power output unit 107.

The input filter 101 is provided in a 3-phase AC input line connected to a power system to remove noise contained in 3-phase AC power input through the power system.

The input filter 101 may include three inductors connected to the 3-phase AC input line. Meanwhile, as shown in the drawings, the input filter 101 may further include capacitors connected to one end of the inductors.

Especially, the input filter 101 is configured to remove harmonics contained in the 3-phase AC power.

The bidirectional power conversion unit 102 is provided at an output terminal of the input filter 101.

The bidirectional power conversion unit 102 converts the 3-phase AC power, which is output through the input filter 101, into DC power to output the DC power in the forward operation mode.

In addition, the bidirectional power conversion unit 102 converts the DC power, which is output through the internal battery 103, into another DC power having a level different from a level of the DC power in the forward operation mode.

In detail, the bidirectional power conversion unit 102 may serve as an AC-DC power conversion unit in the forward operation mode and serve as a DC-DC power conversion unit in the inverse operation mode.

The bidirectional power conversion unit 102 includes a plurality of switching devices and performs the AC-DC power conversion or the DC-DC power conversion according to the switching operation of the switching devices.

At this time, the bidirectional power conversion unit 102 is controlled by the PWM (Pulse Width Modulation) signal to perform the power conversion corresponding to the operation mode.

The bidirectional power conversion unit 102 includes first switching device group, a second switching device group and a third switching device group, which are prepared as pairs, respectively. The switching device may include an IGBT (insulated gate bipolar transistor).

The AC power output through the inductor disposed in the U phase of the 3 phases is input into an intermediate point of a pair of the first switching device groups.

In addition, the AC power output through the inductor disposed in the V phase of the 3 phases is input into an intermediate point of a pair of the second switching device groups.

Further, the AC power output through the inductor disposed in the V phase of the 3 phases is input into an intermediate point of a pair of the third switching device groups.

The bidirectional power conversion unit 102 having the above configuration serves as the AC-DC conversion unit in the forward operation mode to convert the AC power input from the power system into the DC power.

In addition, the bidirectional power conversion unit 102 serves as the DC-DC conversion unit in the inverse operation mode to convert the DC power stored in the internal battery 103 into the DC power.

In this case, each switching device group included in the bidirectional power conversion unit 102 may serve as a buck converter in order to convert the DC power output through the internal battery 103 into another DC power having the level different from the level of the DC power.

For instance, the first switching device group may convert the DC power output through the internal battery 103 into a first DC power to output the first DC power, the second switching device group may convert the DC power into a second DC power to output the second DC power, and the third switching device group may convert the DC power into a third DC power to output the third DC power. At this time, preferably, the first to third DC powers may have the same level although they are output through three DC power lines, respectively.

The internal battery 103 stores the DC power converted through the bidirectional power conversion unit 102 in the forward operation mode. The internal battery 103 may include at least one battery cell. The operation of the at least one battery cell is controlled by a charging control unit 108 which will be described later. The at least one battery cell may be implemented by using various types of battery cells, such as a nickel-cadmium battery, a lead cell, a nickel metal hydride battery, a lithium ion battery, a lithium polymer battery, a metal lithium battery and a zinc air cell. The number of the battery cells may be determined depending on the power capacity and design rules of the charging apparatus 100.

The internal battery 103 may be called an energy storage unit.

The first switch 104 allows the DC power converted through the bidirectional power conversion unit 102 to be output through the internal battery 103 or a first DC power output unit 105 in the forward operation mode.

In detail, under the charging condition of the internal battery 103, the first switch 104 connects the bidirectional power conversion unit 102 to the internal battery 103 such that the DC power converted through the bidirectional power conversion unit 102 can be supplied to the internal battery 103.

In addition, under the first electric vehicle charging condition, the first switch 104 connects the bidirectional power conversion unit 102 to the first DC power output unit 105 such that the DC power converted through the bidirectional power conversion unit 102 can be supplied to the electric vehicle through the first DC power output unit 105.

At this time, the first DC power output unit 105 may be configured as a single charging port to output a single DC power and the single charging port serves as a high-output charging port to output a high DC power.

The second switch 106 allows the DC power converted through the bidirectional power conversion unit 102 to be output through a second DC power output unit 107 in the inverse operation mode.

In detail, when the bidirectional power conversion unit 102 operates in the forward operation mode, the second switch 106 makes contact with the 3-phase AC power input line connected to the power system to supply the 3-phase AC power to the input filter 101 and the bidirectional power conversion unit 102.

In addition, when the bidirectional power conversion unit 102 operates in the inverse operation mode, the second switch 106 makes contact with the second DC power output unit 107 to supply the DC power converted through the bidirectional power conversion unit 102 to the electric vehicle through the second DC power output unit 107.

In this case, the second DC power output unit 107 may include three output lines to supply the DC powers, which are converted through the first to third switching groups, respectively, to the electric vehicle.

The charging control unit 108 controls the overall operation of the charging apparatus 100.

In particular, the charging control unit 108 detects the operation mode of the charging apparatus 100 and controls the switching operation of the switching devices included in the bidirectional power conversion unit 102 such that the bidirectional power conversion unit 102 can be operated in the forward operation mode or the inverse operation mode according to the detected operation mode of the charging apparatus 100.

In addition, when the bidirectional power conversion unit 102 operates in the forward operation mode, the charging control unit 108 controls the switching operation of the first switch 104 to supply the DC power converted through the bidirectional power conversion unit 102 to the internal battery 103 or the first DC power output unit 105.

Further, when the bidirectional power conversion unit 102 operates in the forward operation mode, the charging control unit 108 connects the second switch to the 3-phase AC power input line.

Meanwhile, when the bidirectional power conversion unit 102 operates in the inverse operation mode, the charging control unit 108 controls the switching operation of the switching device groups included in the bidirectional power conversion unit 102 according to the inverse operation mode such that the power conversion can be achieved through the switching device groups.

In addition, when the bidirectional power conversion unit 102 operates in the inverse operation mode, the charging control unit 108 allows the second switch 106 to make contact with the second DC power unit 107 such that the DC power converted through each switching device group can be supplied to the electric vehicle.

Further, the charging control unit 108 may perform the over-charge protection function, over-discharge protection function, over-current protection function, over-voltage protection function, over-heat protection function and cell balancing function in order to protect the internal battery 103. To this end, the charging control unit 108 may monitor the voltage, current, temperature, residual amount of power and life span of the internal battery 103.

As described above, the charging apparatus according to the first embodiment may serve as an energy storage device for storing the DC power in the internal battery, a high-output charging apparatus to charge a battery installed in the electric vehicle by outputting the DC power through a single charging port, or a multi-charging apparatus to charge the battery installed in the electric vehicle by outputting the DC power through a multi-charging port, according to the operation mode of the charging apparatus.

Referring to FIG. 3, the charging apparatus 200 according to the second embodiment includes an input filter 201, a bidirectional power conversion unit 202, an internal battery 203, a AC power output unit 204 and a charging control unit 205.

The input filter 201 is provided in a 3-phase AC input line connected to a power system to remove noise contained in 3-phase AC power input through the power system. The input filter 201 may include three inductors connected to the 3-phase AC input line. Meanwhile, as shown in the drawings, the input filter 201 may further include capacitors connected to one end of the inductors.

Especially, the input filter 201 is configured to remove harmonics contained in the 3-phase AC power.

The bidirectional power conversion unit 202 is provided at an output terminal of the input filter 201.

The bidirectional power conversion unit 202 converts the 3-phase AC power, which is output through the input filter 201, into DC power to output the DC power in the forward operation mode.

In addition, the bidirectional power conversion unit 202 converts the DC power, which is output through the internal battery 203, into AC power to output the AC power in the forward operation mode.

In detail, the bidirectional power conversion unit 202 may serve as an AC-DC power conversion unit in the forward operation mode and serve as a DC-AC power conversion unit in the inverse operation mode.

The bidirectional power conversion unit 202 includes a plurality of switching devices and performs the AC-DC power conversion or the DC-AC power conversion according to the switching operation of the switching devices.

At this time, the bidirectional power conversion unit 202 is controlled by the PWM (Pulse Width Modulation) signal to perform the power conversion corresponding to the operation mode.

The internal battery 203 stores the DC power converted through the bidirectional power conversion unit 202 in the forward operation mode. The internal battery 203 may include at least one battery cell. The operation of the at least one battery cell is controlled by the charging control unit 205 which will be described later. The at least one battery cell may be implemented by using various types of battery cells, such as a nickel-cadmium battery, a lead cell, a nickel metal hydride battery, a lithium ion battery, a lithium polymer battery, a metal lithium battery and a zinc air cell. The number of the battery cells may be determined depending on the power capacity and design rules of the charging apparatus 200.

The AC power output unit 204 is connected to the 3-phase AC power input line of the charging apparatus 200 and outputs the AC power to the electric vehicle as the bidirectional power conversion unit 202 operates in the forward operation mode.

That is, the AC power output unit 204 may serve as a slow charger which charges the electric vehicle using the AC power.

In addition, in the first embodiment, the first DC power output unit 105 and the second DC power output unit 107 may serve as a high-output quick charger and a multi-quick charger, respectively, which charge the electric vehicle using the DC power.

Similar to the charging control unit 108 according to the first embodiment, the charging control unit 205 controls the overall operation of the charging apparatus 200.

In the forward operation mode, the charging control unit 205 allows the AC power supplied from the power system to be converted into the DC power through the bidirectional power conversion unit 202 such that the internal battery 203 can be charged with the DC power.

In the inverse operation mode, the charging control unit 205 allows the DC power stored in the internal battery 203 to be converted into the AC power through the bidirectional power conversion unit 202 such that the AC power can be output through the AC power output unit 204.

At this time, in the inverse operation mode, the charging control unit 205 allows the converted AC power to be output to the AC power output unit 204 or recovered to the power system according to the existence of the electric vehicle connected to the AC power output unit 204.

As described above, the charging apparatus according to the second embodiment may serve as an energy storage device for storing the power in the internal battery, a charger to charge the electric vehicle by converting the stored power into the AC power, or a recovery device to convert the stored power into the AC power to recover the AC power to the power system.

Hereinafter, the charging apparatuses according to the first and second embodiments will be described in more detail with reference to FIGS. 4 to 8.

In addition, as described above, the charging apparatuses according to the first and second embodiments can be integrated as one charging apparatus. In this regard, for the purpose of convenience of explanation, the following description will be made on the assumption that the AC power output unit 204 is integrated into the charging apparatus 100 according to the first embodiment.

FIGS. 4 to 8 are views to explain an operation of the charging apparatus according to the embodiment.

Figure 4:
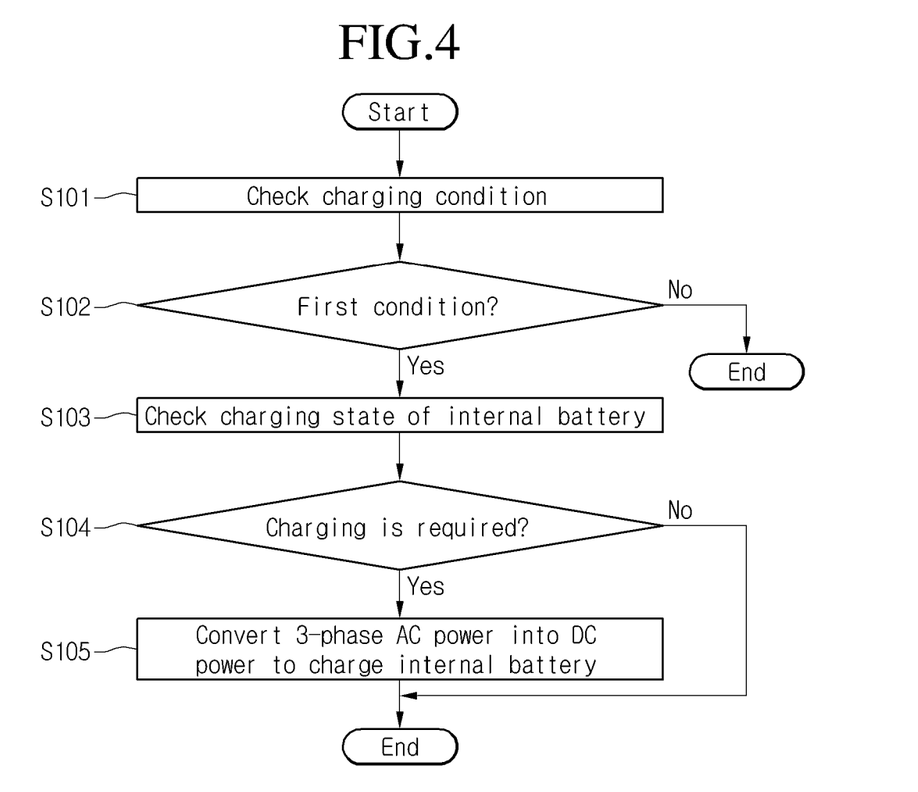
FIGS. 4 to 8 are views to explain an operation of a charging apparatus according to the embodiment.

First, referring to FIG. 4, the charging control unit 108 checks the operation condition of the charging apparatus, that is, the charging condition of the charging apparatus (S101).

The charging condition may include a unit price of power input through the power system, a charging state of the internal battery 103 and existence of the electric vehicle connected to the second DC power output unit and the AC power output unit.

Then, the charging control unit 108 determines whether the charging condition satisfies a first charging condition (S102).

That is, the charging control unit 108 determines whether there is no electric vehicle connected to the second DC power output unit and the AC power output unit and whether the unit price of the power is equal to or less than a predetermined reference price.

If it is determined in step S102 that the charging condition satisfies the first charging condition, the charging control unit 108 checks the charging condition of the internal battery (S103). In other words, the charging control unit 108 checks the charging state of the internal battery 103 (for instance, charge capacity).

Then, the charging control unit 108 determines whether the charging state of the internal battery 103 requires the charging operation (S104). In detail, the charging control unit 108 determines whether the internal battery 103 needs to be charged because the charge capacity of the internal battery 103 is less than the reference capacity.

If it is determined in step 104 that the charging state of the internal battery 103 requires the charging operation, the charging control unit 108 converts the AC power supplied from the power system into the DC power to charge the internal battery 103 with the DC power (S105).

To this end, the charging control unit 108 forms a power path to allow the first switch 104 to make contact with the internal battery 103 and to allow the second switch 106 to make contact with the 3-phase AC power input line that receives the 3-phase AC power.

Figure 5:
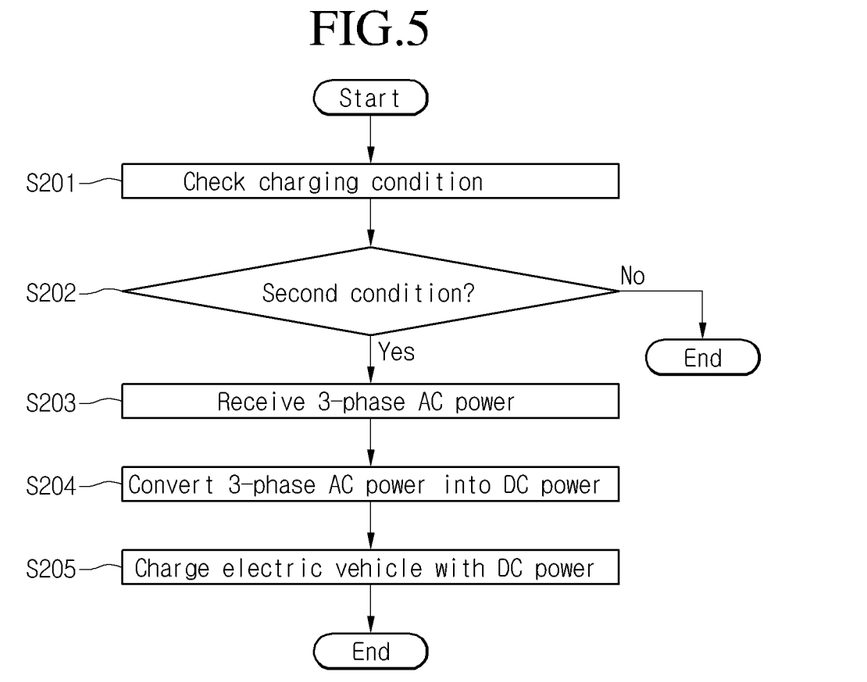

After that, referring to FIG. 5, the charging control unit 108 checks again the charging condition (S201).

In addition, the charging control unit 108 determines whether the charging condition satisfies a second charging condition (S202).

That is, the charging control unit 108 determines whether the electric vehicle is connected to the first DC power output unit 105.

If it is determined in step S202 that the electric vehicle is connected to the first DC power output unit 105, the charging control unit 108 receives the 3-phase AC power from the power system (S203) and converts the 3-phase AC power into the DC power through the bidirectional power conversion unit 102 (S204) to output the DC power through the first DC power output unit 105 (S205).

To this end, the charging control unit 108 forms a power path to allow the first switch 104 to make contact with the first DC power output unit 105 and allow the second switch 106 to make contact with the 3-phase AC power input line that receives the 3-phase AC power.

Figure 6:
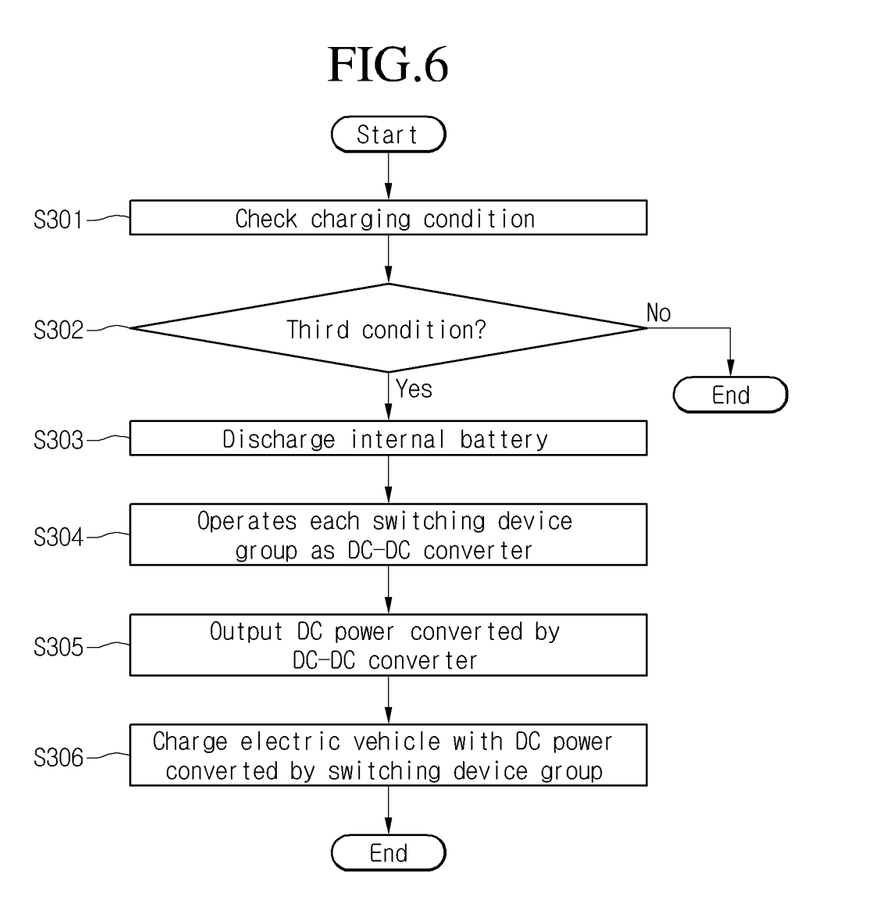

After that, referring to FIG. 6, the charging control unit 108 checks again the charging condition (S301).

In addition, the charging control unit 108 determines whether the charging condition satisfies a third charging condition (S302).

That is, the charging control unit 108 determines whether the electric vehicle is connected to the second DC power output unit 107.

If it is determined in step S302 that the electric vehicle is connected to the second DC power output unit 107, the charging control unit 108 discharges the internal battery 103 to output the DC power stored in the internal battery 103 (S303).

In addition, the charging control unit 108 operates the bidirectional power conversion unit 102 in the inverse operation mode. In detail, the charging control unit 108 enables the switching device groups included in the bidirectional power conversion unit 102 to operate as DC-DC converters, in more detail, as buck-converts in the inverse operation mode (S304).

Then, the charging control unit 108 converts the DC power output from the internal battery 103 by using the switching device groups so that the multi-AC power is output through the switching device groups (S305).

After that, the charging control unit 108 allows the electric vehicle connected to the second DC power output unit 107 to be charged with the multi-AC power (S306).

To this end, the charging control unit 108 forms a power path to allow the first switch 104 to make contact with the internal battery 103 and allow the second switch 106 to make contact with the second DC power output unit 107.

Figure 7:
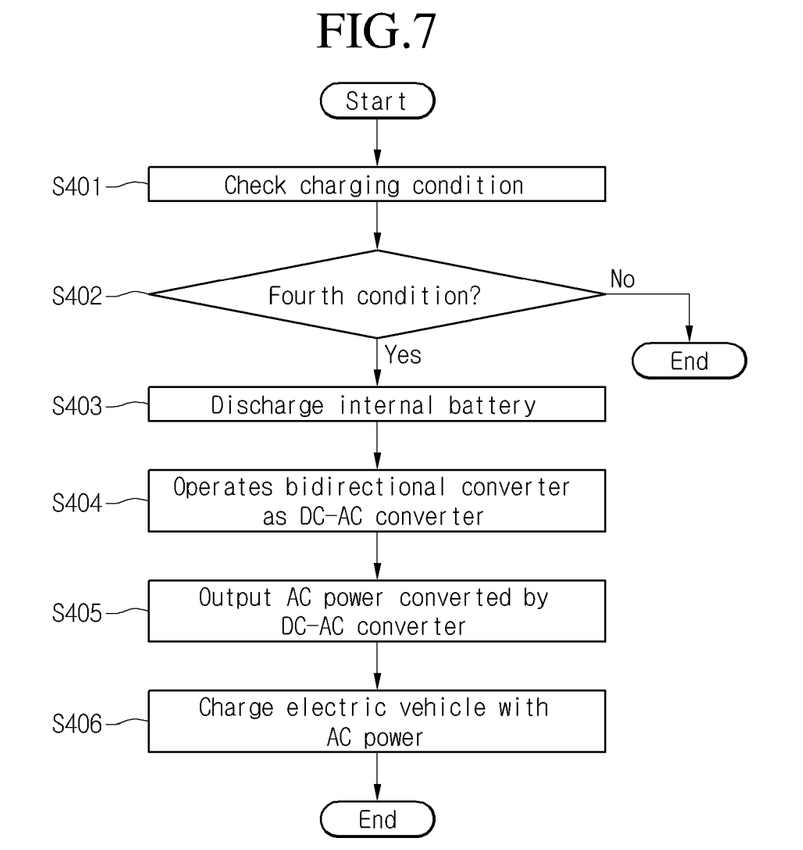

After that, referring to FIG. 7, the charging control unit 108 checks again the charging condition (S401).

In addition, the charging control unit 108 determines whether the charging condition satisfies a fourth charging condition (S402).

That is, the charging control unit 108 determines whether the electric vehicle is connected to the AC power output unit 204.

If it is determined in step 402 that the electric vehicle is connected to the AC power output unit 204, the charging control unit 108 discharges the internal battery 103 to output the DC power stored in the internal battery 103 (S403).

Then, the charging control unit 108 operates the bidirectional power conversion unit 102 in the inverse operation mode. In detail, the charging control unit 108 enables the bidirectional power conversion unit 102 to operate as a DC-AC converter in the inverse operation mode (S404).

In addition, the charging control unit 108 outputs the AC power converted by the bidirectional power conversion unit 102 to the AC power output unit 204 (S405).

After that, the charging control unit 108 allows the electric vehicle connected to the AC power output unit 204 to be charged with the AC power output through the AC power output unit 204 (S406).

To this end, the charging control unit 108 forms a power path to allow the first switch 104 to make contact with the internal battery 103 and allow the second switch 106 to make contact with the 3-phase AC power input line.

Figure 8:
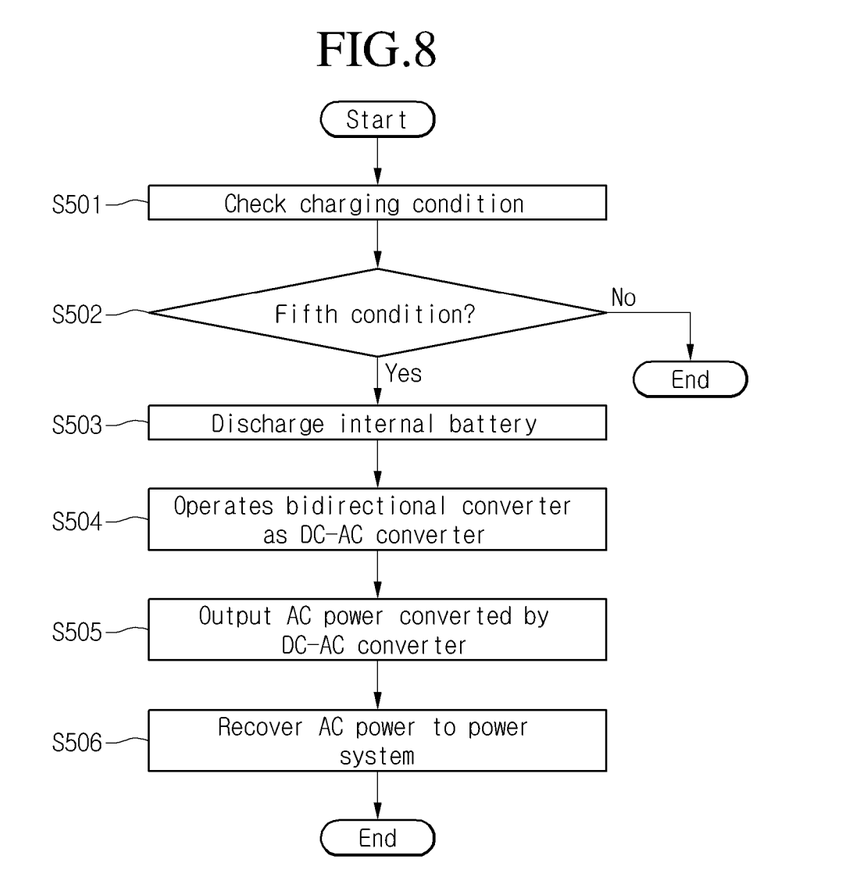

After that, referring to FIG. 8, the charging control unit 108 checks again the charging condition (S501).

In addition, the charging control unit 108 determines whether the charging condition satisfies a fifth charging condition (S502).

That is, the charging control unit 108 determines whether there is no electric vehicle and the internal battery 103 is fully charged.

If it is determined in step 502 that there is no electric vehicle and the internal battery 103 is fully charged, the charging control unit 108 discharges the internal battery 103 to output the DC power stored in the internal battery 103 (S503).

Then, the charging control unit 108 operates the bidirectional power conversion unit 102 in the inverse operation mode. In detail, the charging control unit 108 enables the bidirectional power conversion unit 102 to operate as a DC-AC converter in the inverse operation mode (S504).

In addition, the charging control unit 108 outputs the AC power converted by the bidirectional power conversion unit 102 (S505) such that the AC power can be recovered to the power system (S506).

To this end, the charging control unit 108 forms a power path to allow the first switch 104 to make contact with the internal battery 103 and allow the second switch 106 to make contact with the 3-phase AC power input line.

As described above, according to the embodiment, the power converting apparatus may have the flexible structure and various types of charging ports can be constructed in the AC charging station and the DC charging station.

In addition, according to the embodiment, the number of components can be reduced and the size of the module can be diminished by commonly utilizing common sections of functional modules constituting the charging apparatus.

Further, according to the embodiment, the charging apparatus can be utilized as an auxiliary power storage device in consideration of the unit price of power.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A bidirectional vehicle charging apparatus to supply a power to a battery of an electric vehicle, the charging apparatus comprising:

a bidirectional power converter including three pairs of switching device groups, at least one capacitor and at least one inductor and having a first port connected to a power system and an a second port connected to an energy storage, in which the bidirectional power converter converts an AC power input through the first port into a DC power to output the DC power to the second port in a forward operation mode and converts the DC power input through the second port into a plurality of DC powers to output the plurality of DC powers to the first port in a first inverse operation mode, wherein the bidirectional power converter is operated as an AC-DC converter according to switching operation of the three pairs of switching device groups in the forward operation mode and is operated as a plurality of buck-converters according to switching operation of the three pairs of switching device groups in the first inverse operation mode;

the energy storage connected to the second port of the bidirectional power converter to store the DC power output through the second port of the bidirectional power converter;

a multi-DC power outputter disposed between the power system and the first port of the bidirectional power converter to output the plurality of DC powers, which is output through the first port of the bidirectional power converter, to outside components in the first inverse operation mode;

a first switch having one end connected to the first port of the bidirectional power converter and an opposite end selectively connected to one of an input line of a 3-phase AC power and the multi-DC power outputter;

a charging controller to detect a charging condition of the charging apparatus, in which the charging controller operates the bidirectional power converter in the forward operation mode to charge the energy storage when the charging condition is a first condition and operates the bidirectional power converter in the first inverse operation mode to output the DC power through the multi-DC power outputter when the charging condition is a second condition; and a DC power outputter connected to the second port of the bidirectional power converter to output the DC power converted by the bidirectional power converter to an outside component in the forward operation mode, wherein the multi-DC power outputter outputs the plurality of DC powers, and the DC power outputter outputs a single DC power, wherein the DC power output to the outside component has a level that is higher than a level of the DC power converted by the bidirectional power converter in the first inverse operation mode, and wherein the three pairs of the switching device groups of the bidirectional power converter serve as buck-converters, respectively, in the first inverse operation mode to convert the DC power into the plurality of DC powers having a level that is different from the level of the DC power.

2. The bidirectional vehicle charging apparatus of claim 1, wherein the power system supplies the 3-phase AC power, and the three pairs of the switching device groups comprise:

a first switching device group connected to a first phase of the power system;

a second switching device group connected to a second phase of the power system; and a third switching device group connected to a third phase of the power system, and wherein each of the first to third switching device groups serves as a buck-converter in the first inverse operation mode to convert the DC power stored in the energy storage into another DC power having a level that is different from the level of the DC power.

3. The bidirectional vehicle charging apparatus of claim 2, further comprising a second switch having one end connected to the second port of the bidirectional power converter and an opposite end selectively connected to one of the energy storage and the DC power outputter to output the converted DC power to one of the energy storage and the DC power outputter.

4. The bidirectional vehicle charging apparatus of claim 3, further comprising an input filter disposed between the power system and the bidirectional power converter to supply the AC power to the first port of the bidirectional power converter by removing noise contained in the AC power supplied from the power system.

5. The bidirectional vehicle charging apparatus of claim 4, further comprising an AC power outputter connected to the input line of the 3-phase AC power to output the AC power supplied through the first port of the bidirectional power converter to the electric vehicle located outside in the second inverse operation mode.

* * * * *